United States Patent
Betts-LaCroix et al.

(10) Patent No.: US 7,352,332 B1
(45) Date of Patent: Apr. 1, 2008

(54) MULTIPLE DISPARATE WIRELESS UNITS SHARING OF ANTENNAS

(75) Inventors: Jonathan Betts-LaCroix, Chatsworth, CA (US); Mike Furlotti, San Francisco, CA (US)

(73) Assignee: OQO, Inc., San Francisco, CA (US)

( * ) Notice: Subject to any disclaimer, the term of this patent is extended or adjusted under 35 U.S.C. 154(b) by 72 days.

(21) Appl. No.: 11/234,477

(22) Filed: Sep. 22, 2005

Related U.S. Application Data

(60) Provisional application No. 60/612,605, filed on Sep. 22, 2004.

(51) Int. Cl.
*H01Q 1/00* (2006.01)
*H01Q 3/24* (2006.01)

(52) U.S. Cl. ....................... 343/729; 343/876
(58) Field of Classification Search ................ 343/702, 343/729, 893, 876
See application file for complete search history.

(56) References Cited

U.S. PATENT DOCUMENTS

| | | | |
|---|---|---|---|
| 6,538,606 B2 | 3/2003 | Quinn et al. | |
| 6,781,052 B2 | 8/2004 | Hasenauer | |
| 6,928,302 B1 | 8/2005 | Kinney et al. | |
| 6,978,121 B1* | 12/2005 | Lane et al. | ............ 455/73 |
| 2005/0208900 A1* | 9/2005 | Karacaoglu | ............ 455/78 |

* cited by examiner

*Primary Examiner*—Shih-Chao Chen
(74) *Attorney, Agent, or Firm*—Mattingly, Stanger, Malur & Brundidge, P.C.

(57) ABSTRACT

Multiple disparate wireless units sharing of antennas are described herein. In one embodiment, an apparatus includes, but is not limited to, a first wireless communication unit of a first wireless communication standard, where the first standard includes selecting one of two antennas provided. The apparatus further includes a second wireless communication unit of a second wireless communication standard, where a first antenna and a second antenna are shared by the first and second communication units. Other methods and apparatuses are also described.

11 Claims, 8 Drawing Sheets

| A | B | C | Y |
|---|---|---|---|
| 0 | 0 | 0 | 1 |
| 0 | 0 | 1 | 0 |
| 0 | 1 | 0 | 1 |
| 0 | 1 | 1 | 0 |
| 1 | 0 | 0 | 0 |
| 1 | 0 | 1 | 0 |
| 1 | 1 | 0 | 1 |
| 1 | 1 | 1 | 1 |

FIG. 3B

MULTIPLE DISPARATE WIRELESS UNITS SHARING OF ANTENNAS

RELATED APPLICATIONS

This application claims the benefit of U.S. Provisional Patent Application No. 60/612,605, entitled "Multiple Disparate Wireless Units Sharing Antennas", filed Sep. 22, 2004, which is incorporated herein in its entirety.

FIELD OF THE INVENTION

The present invention relates generally to wireless communications. More particularly, this invention relates to multiple disparate wireless units sharing antennas.

BACKGROUND

In recent years there has been an increase effort to improve functionality of mobile personal computing systems. This has led to a desire to incorporate multiple wireless communication standards within small computing systems such as notebook computer, personal digital assistants (PDA), and other hand-held computing devices.

Two notable wireless communication standards include WiFi (based on the Institute of Electrical and Electronic Engineering (IEEE) 802.11 specification/standard) and Bluetooth® (based on IEEE 802.15 specification/standard. WiFi (wireless fidelity) provides a high-frequency wireless local area network (WLAN) standard for an over-the-air interface between a wireless client and a base station, or between two wireless clients. The 802.11 standard calls for diversity, to allow an 802.11 communications unit to chose from one of two antennas provided, based on quality of reception/transmission etc. For example, one of the two antennas may be covered by finger of user of a handheld device affecting its reception/transmission.

Bluetooth® provides an additional wireless radio standard primarily designed for low power consumption, with a range of typically 10 meters. For example, Bluetooth® provides a way to connect and exchange information between devices like PDAs, mobile phones, laptops, PCs, printers and digital cameras via the short range radio frequency. The Bluetooth® standard calls for a single wireless antenna.

SUMMARY OF THE DESCRIPTION

Multiple disparate wireless units sharing of antennas are described herein. In one embodiment, an apparatus includes, but is not limited to, a first wireless communication unit of a first wireless communication standard, where the first standard includes selecting one of two antennas provided. The apparatus further includes a second wireless communication unit of a second wireless communication standard, where a first antenna and a second antenna are shared by the first and second communication units.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

FIGS. 3A and 3B are diagrams illustrating an example of switch control logic according to one embodiment of the invention.

DETAILED DESCRIPTION

Multiple disparate wireless units sharing of antennas are described herein. In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

One embodiment of the present invention provides multiple disparate wireless communication units on a computing device sharing antennas. In one embodiment, the computing device includes a first wireless communication unit of a first wireless communication standard, which calls for a choice from among two antennas provided. The computing device also includes a second wireless communication unit of a second wireless communication standard, and a first antenna and a second antenna to be used by the first and second communication units. In one embodiment, the first communication standard includes the 802.11 standard (also referenced as WiFi), and the second communication standard is the 802.15 standard (also referenced as Bluetooth). Furthermore, in one embodiment, the computing device having a hand-held form factor that is to execute a Windows or Linux based operating system, and further includes an X86 based processor.

Note that throughout this application, IEEE 802.11 and IEEE 802.15 are used as examples of two different wireless communication standards. It is not so limited. Other wireless communication standards may also be utilized.

Figure 1:
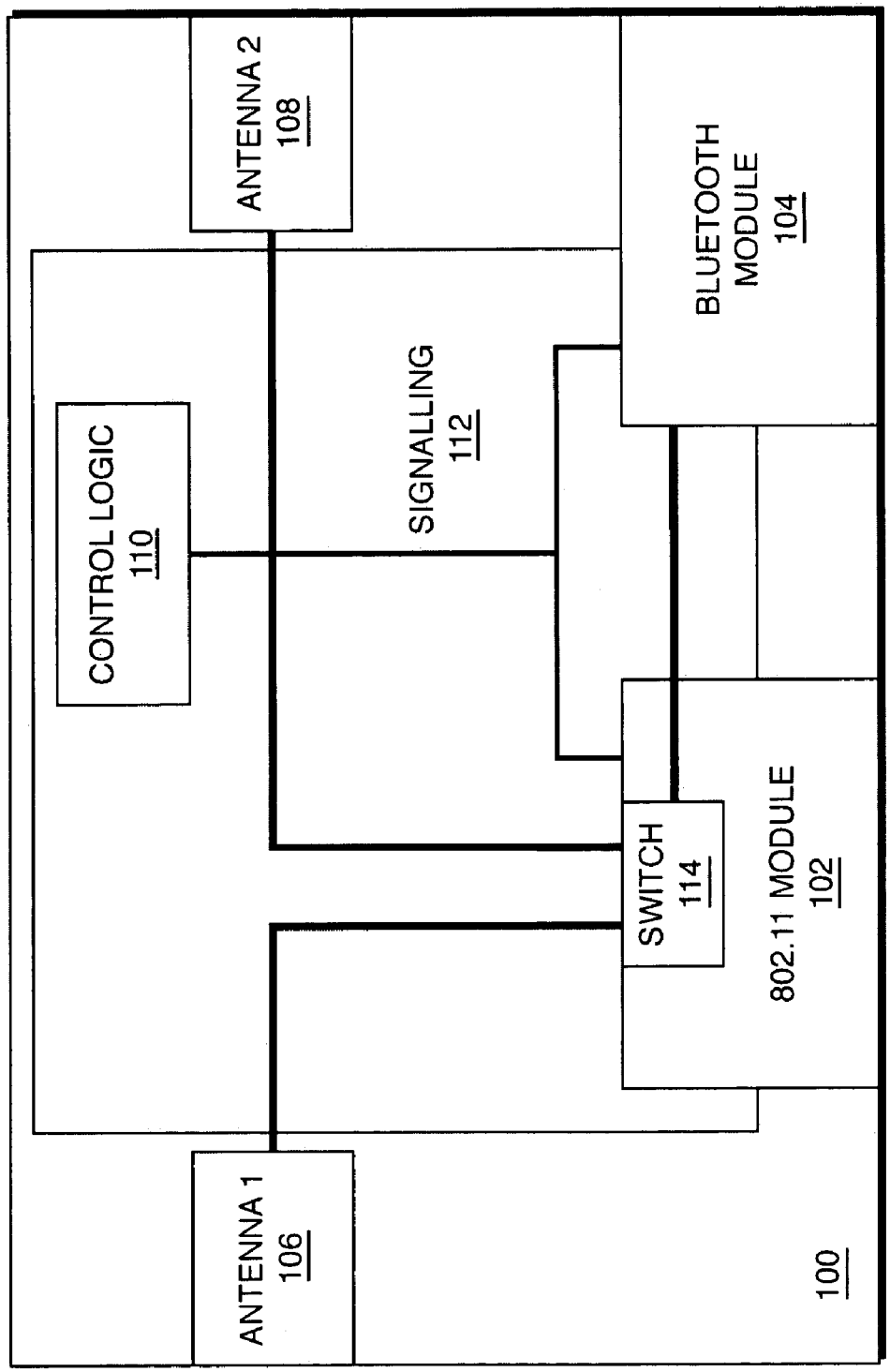
FIG. 1 is a diagram of a computing device having multiple wireless communication units sharing antennas in accordance with one embodiment.

FIG. 1 illustrates one embodiment of a computing device 100 having multiple disparate wireless communication units 102, 104 sharing only two antennas 106, 108. As illustrated in FIG. 1, the computing device 100 includes a first wireless communication unit 102 based on a first wireless communication standard. In one embodiment, the first wireless communication standard is 802.11, which supports diversity between two or more antennas. In one embodiment, the diversity between the two antennas includes having a choice among multiple antennas to select an antenna that may have better quality reception at a particular moment.

As further illustrated, the first unit 102 is to choice from one of two wireless antennas 106, 108 included in the computing device. As illustrated, a first wireless antenna 106 is placed along a first of four sides provided in one embodiment of the chassis of the computing device, and the second wireless antenna 108 is placed along a second side, opposing the first side of the chassis.

FIG. 1 further illustrates the computing device including a second wireless communication unit 104 based on a second disparate wireless communication standard. In one embodiment, the second wireless communication standard is 802.15, which calls for only one wireless antenna. The first wireless communication unit 102 implementing diversity between two antennas, and the second wireless communication unit 104, share only two antennas 106, 108. In alternative embodiment, the first or second wireless communication units may be based on alternative wireless communication standards without departing from the scope of the invention.

The need to pair the wireless communication units 102, 104 with one of the antennas, usually begins with an end-user of the computing device performing an activity on the computing device that either explicitly or implicitly calls for the exchange of data via one of the two wireless communication units. In one embodiment, the call for the exchange of data is provided by the operating system of computing device, in the form of a message/interrupt provided to control logic 110 provided in the computing device 100. In response to the message/interrupt, the control logic 110 issues a signal 112 to one or both of the wireless communication units 102, 104.

In response to the signal from the control logic 110, the wireless communication unit 102 and/or 104 proceeds to gain control of an antenna to transfer or receive data, in accordance with the signal. In one embodiment, the selection of the antenna is based on one or more of several factors. For example, one of the antennas 106, 108 may already be in use by one of the units 102, 104. If one of the antennas is in use by one of the units, the antenna may be in use under a high priority mode, of multiple modes. These factors, and possibly others, are feed into a switch unit 114 in the form of signals, which uses the factors/signals to determine which wireless communication units 102, 104 are to be connected with which of the antennas 106, 108, in accordance with one embodiment.

More specifically, in one embodiment, the switch unit 114 is directed by switch control logic. In one embodiment, the switch control logic is based on an activity state of the wireless communication units 102, 104, and/or an antenna control signal 112 from the control logic 110.

Figure 2:
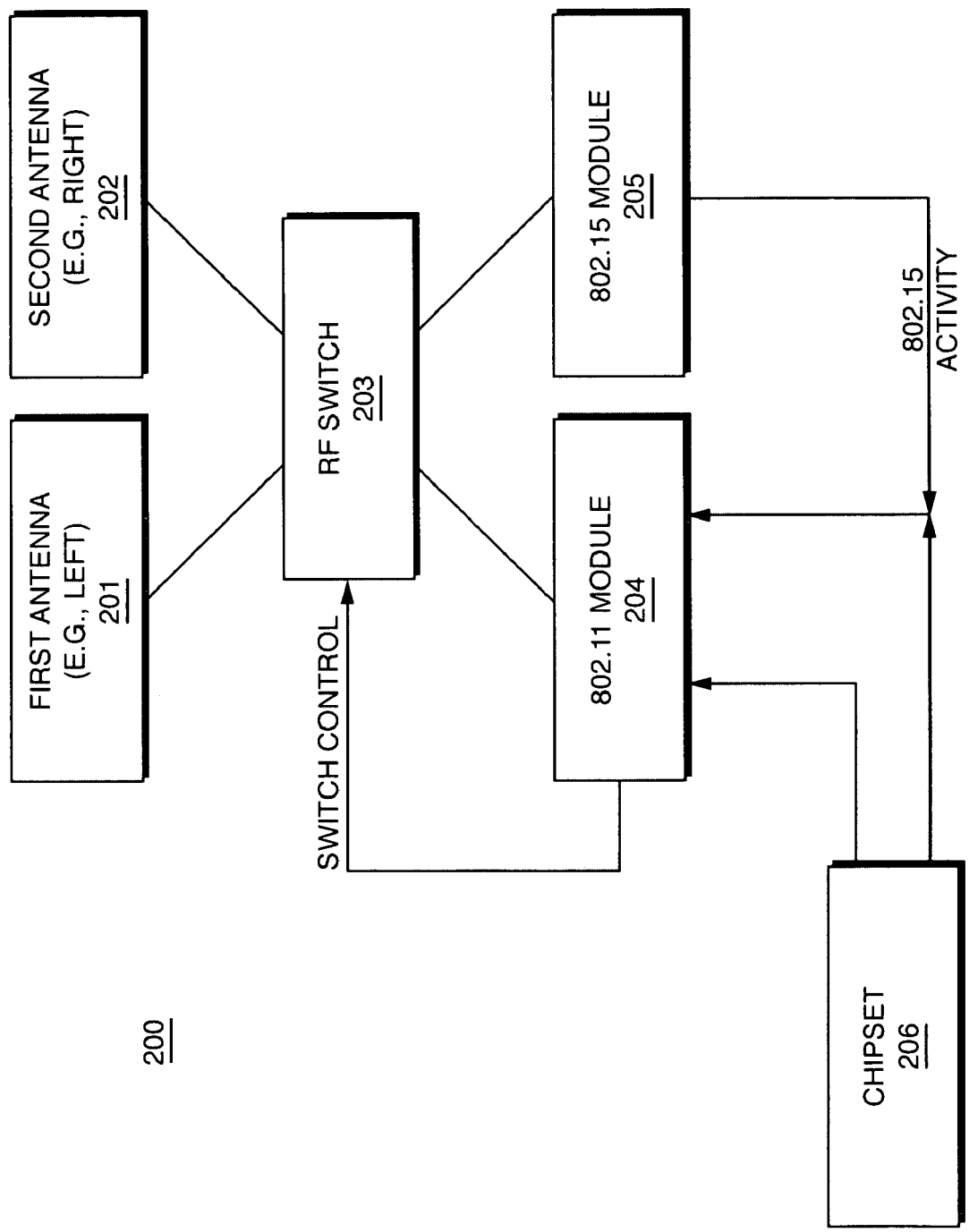
FIG. 2 is a diagram of a computing device having multiple wireless communication units sharing antennas in accordance with an alternative embodiment.

FIG. 2 is a block illustrating an example of a computer system according to one embodiment of the invention. For example, system 200 may be implemented as a part of a portable or hand-held computing device, similar to device 100 of FIG. 1. Referring to FIG. 2, system 200 includes, but is not limited to, a first antenna 201 and a second antenna 202 coupled to a switch 203, where switch 203 may switch between first antenna 201 and second antenna 202 to allow either one of first and second wireless communication modules 204 and 205 to be coupled to any one of antennas 201 and 202. In one embodiment, first antenna 201 may be an IEEE 802.11 compatible antenna and second antenna 202 may be an IEEE 802.15 compatible antenna. Similarly, module 204 may be an IEEE 802.11 module responsible for handling IEEE 802.11 compatible signals and module 205 may be an IEEE 802.15 module responsible for handling IEEE 802.15 compatible signals.

In addition, the first and second wireless communication module 204-205 may be coupled to control logic 206, which may be implemented, for example, a chipset of computer system 200. In one embodiment, module 204 may include switch control logic (not shown) to control switch 203. Alternatively, the switch control logic may be implemented in module 205 or separated from any one of the modules 204-205. The switch control logic may control the switch 203 based on the activities of module 204 and/or module 205. For example, if module 204 needs to transmit or receive IEEE 802.11 signals, the switch control logic may control the switch 203 to couple module 204 to an IEEE 802.11 compatible antenna (e.g., first antenna 201). Alternatively, the switch control logic may be controlled by the control logic 206, for example, in response to an interrupt received by control logic or chipset 206. Other configurations may exist.

Figure 3A:
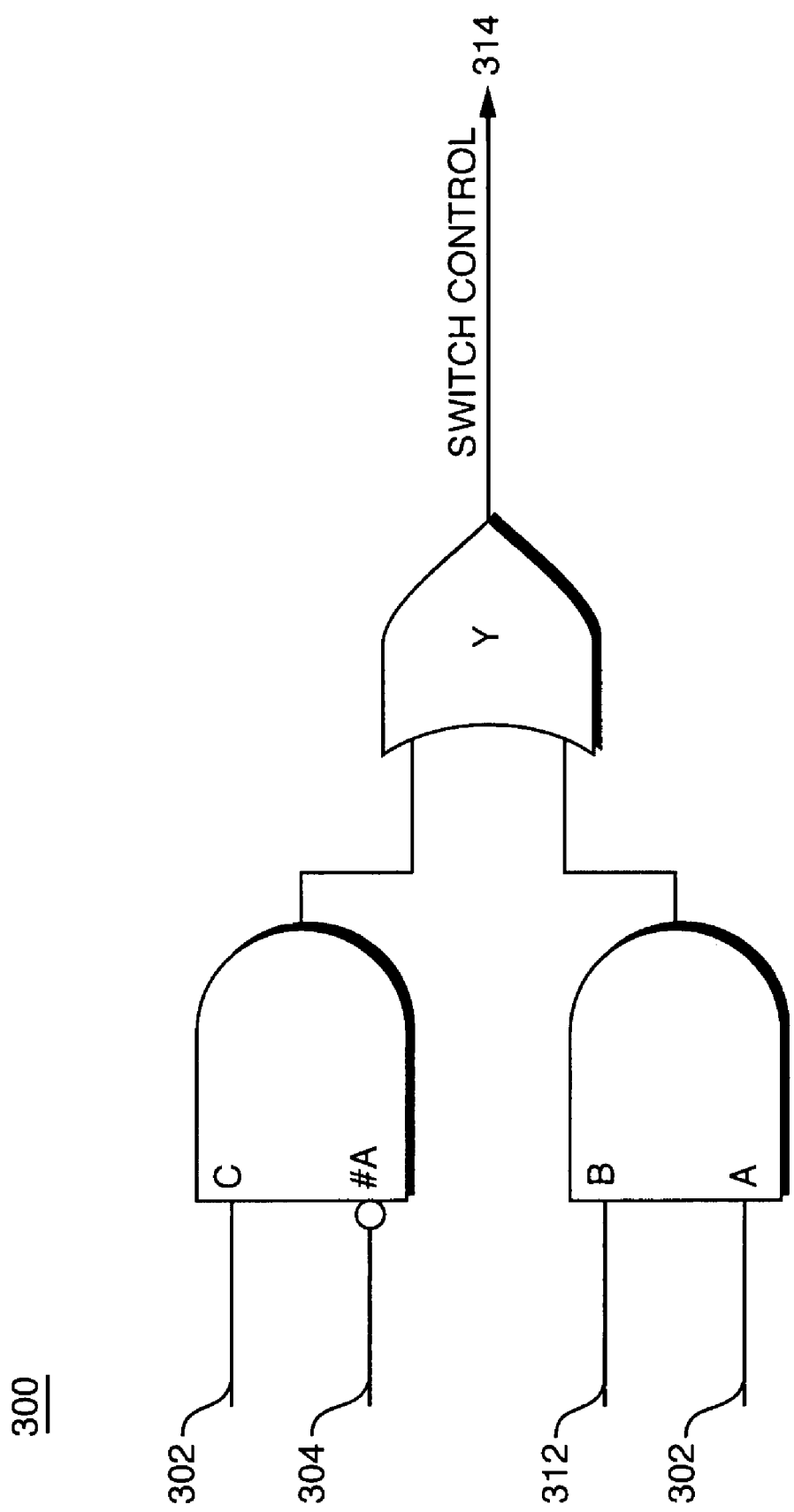

FIG. 3A is a block diagram illustrating an example of switch control logic according to one embodiment of the invention. For example, the switch control logic 300 may be implemented within system 100 of FIG. 1 for determining which wireless communication units 102, 104 are to be connected with which of the antennas 106, 108. In one embodiment, the switch control logic receives an activity state 302 of the wireless communication unit 104. The activity state 302 may represent whether the wireless communication unit 104 is already active with an antenna and/or whether the activity is of a high or low priority.

For example, the wireless communication unit 104 could be active with an antenna in a low priority, in which case the wireless communication unit 104 may not oppose switching antennas to allow wireless communication unit 102 to choose between antennas. Alternatively, the wireless communication unit 104 could be active with an antenna in a high priority, in which the wireless communication unit 104 would oppose to being switched to the other antenna. In one embodiment, the activity state 304 of the wireless communication unit 104 is only asserted when the wireless communication unit 104 is in a high priority mode of data exchange.

In one embodiment, the switching control logic 300 further receives the control signal 312 from the control logic 110 and an activity state 302 of the wireless communication unit 102. Based on the input signals, the switch control logic generates a switch control signal 314 feed into the switch unit 114 to direct the switch unit in connecting a wireless communication unit 102, 104 to an antenna 106, 108. In alternative embodiments, the switch control logic 300 may use alternative logic to direct the switch unit 114, as well as using alternative inputs, without departing from the present invention. Furthermore, in one embodiment, the switching logic 300 may be controlled by the control logic 110 without receiving the activity states of the wireless communication units 102, 104.

In one embodiment, the switch control logic 300 and/or the switch unit 114 are integrated onto wireless communication unit 102. In alternative embodiments, the switch control logic 300 and/or the switch unit 114 could alternatively be implemented on the wireless communication unit 104, the control logic 110, or provided as discrete units.

Alternatively, switch control logic 300 may be implemented as part of system 200 of FIG. 2, according to another embodiment of the invention. FIG. 3B is a state diagram illustrating an example of a state table which may be used with the switch control logic of FIG. 3A, according to one embodiment.

Figure 4:
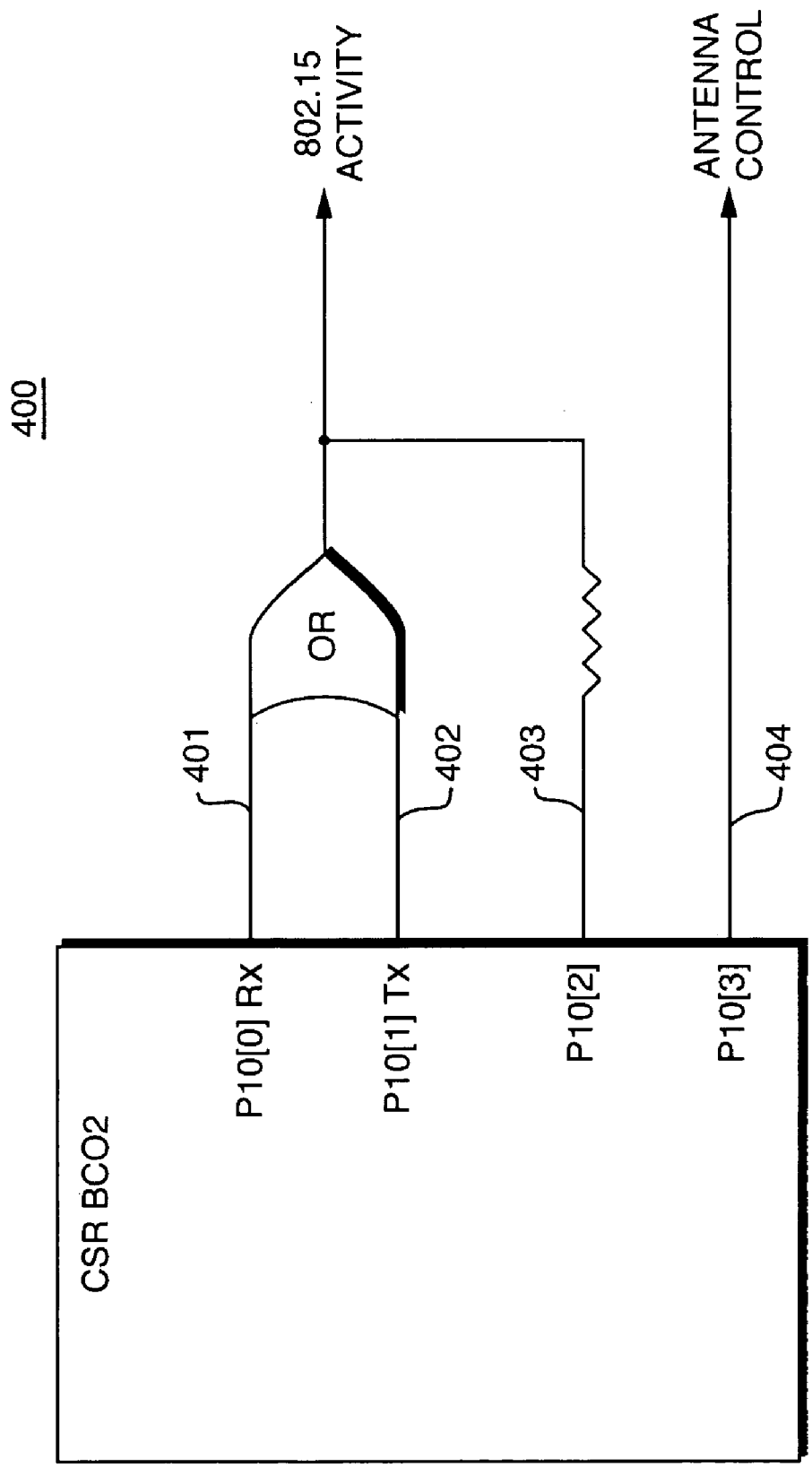
FIG. 4 is a diagram illustrating a wireless communication module according to one embodiment of the invention.

FIG. 4 is a block diagram illustrating an example of a wireless communication unit according to one embodiment of the invention. For example, wireless communication unit 400 maybe implemented as a part of IEEE 802.15 compatible module, similar to module 104 of FIG. 1 and/or module 205 of FIG. 2. Unit 400 may be used to generate signals indicating whether there are IEEE 802.15 compatible activities. In one embodiment, CSR receiving signals Rx 401 and/or transmitting signals Tx 402 may be used to generate whether there is an activity for IEEE 802.15 signals. Alternatively, according to another embodiment, other pins of CSR, such as, for example, programmable input/output PIO [2:3] 403-404 may be used for such purpose, including antenna controls. Other configurations may exist.

Figure 5:
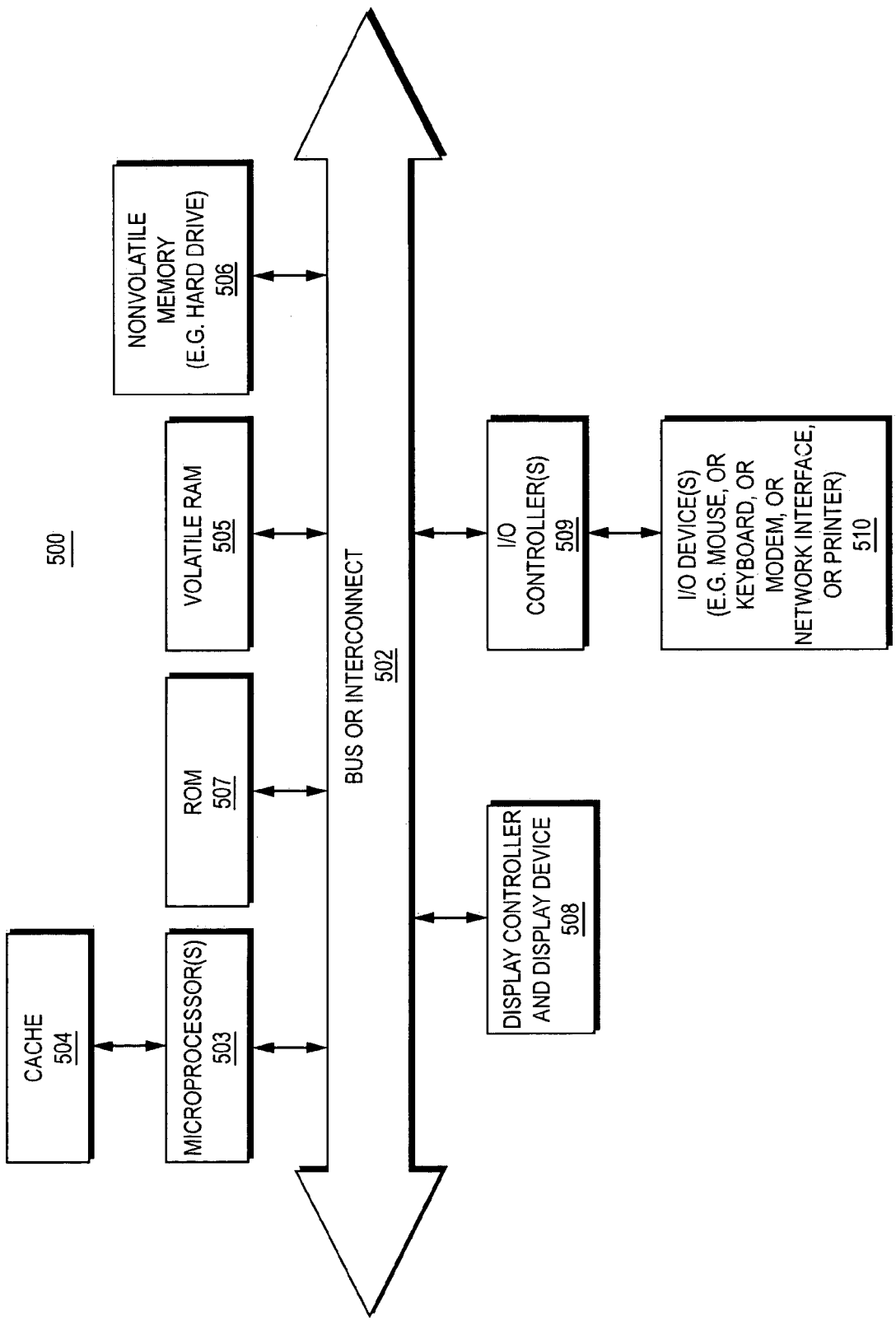
FIG. 5 is a block diagram illustrating an example of a computer system which may be used with an embodiment of the invention.

FIG. 5 is a block diagram illustrating a data processing system which may be used with an embodiment of the invention. For example, system 500 may be a portable or hand-held device having shared wireless antennas using some or all of the techniques described above.

Note, that while FIG. 5 illustrates various components of a computer system, it is not intended to represent any particular architecture or manner of interconnecting the components, as such details are not germane to the present invention. It will also be appreciated that network computers, handheld computers, cell phones, and other data processing systems which have fewer components or perhaps more components may also be used with the present invention. The computer system of FIG. 5 may, for example, be an Apple Macintosh computer or an IBM compatible PC.

As shown in FIG. 5, the computer system 500, which is a form of a data processing system, includes a bus 502 which is coupled to a microprocessor 503 and a ROM 507, a volatile RAM 505, and a non-volatile memory 506. The microprocessor 503, which may be, for example, a PowerPC microprocessor from IBM or a Pentium processor from Intel, is coupled to cache memory 504 as shown in the example of FIG. 5. The bus 502 interconnects these various components together and also interconnects these components 503, 507, 505, and 506 to a display controller and display device 508, as well as to input/output (I/O) devices 510, which may be mice, keyboards, modems, network interfaces, printers, and other devices which are well-known in the art.

Typically, the input/output devices 510 are coupled to the system through input/output controllers 509. The volatile RAM 505 is typically implemented as dynamic RAM (DRAM) which requires power continuously in order to refresh or maintain the data in the memory. The non-volatile memory 506 is typically a magnetic hard drive, a magnetic optical drive, an optical drive, or a DVD RAM or other type of memory system which maintains data even after power is removed from the system. Typically, the non-volatile memory will also be a random access memory, although this is not required.

While FIG. 5 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 502 may include one or more buses connected to each other through various bridges, controllers, and/or adapters, as is well-known in the art. In one embodiment, the I/O controller 509 includes a USB (Universal Serial Bus) adapter for controlling USB peripherals. Alternatively, I/O controller 509 may include an IEEE-1394 adapter, also known as FireWire adapter, for controlling FireWire devices.

In one embodiment the multiple disparate wireless communication units on a computing device sharing antennas are implemented on a hand-held personal computing device 500 as illustrated in FIG. 5. In one embodiment, the computing device includes stored thereon, and is to execute, a Windows® based or Linux® based, operating system, including Windows XP® operating system in one embodiment. In addition, in one embodiment, the computing device includes an X86(based processor, including a Transmetta® processor in one embodiment. The computing device further includes a random access memory, of 256 MB in one embodiment, a color transflective display/screen 302, a hard drive, of 20 GB in one embodiment, as well as Fire Wire and Universal Serial Bus ports, in one embodiment. In alternative embodiment, the computing device may include and run on alternative operating systems, include an alternative processor, and a memory and/or hard drive of different specifications without departing from the present invention.

Figure 6A:
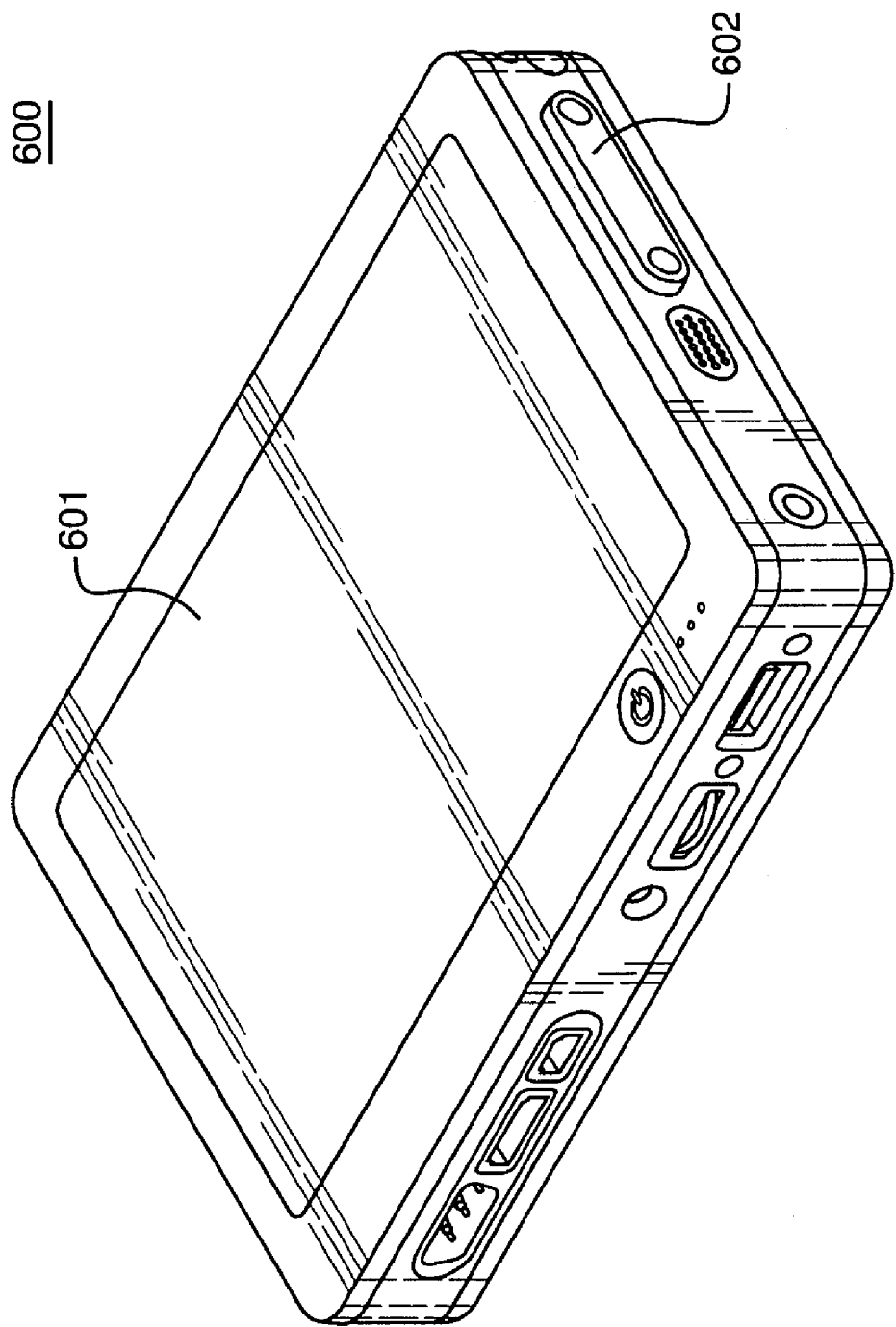
FIGS. 6A and 6B are diagrams illustrating an example of a hand-held device which may be used with one embodiment of the invention.
Figure 6B:
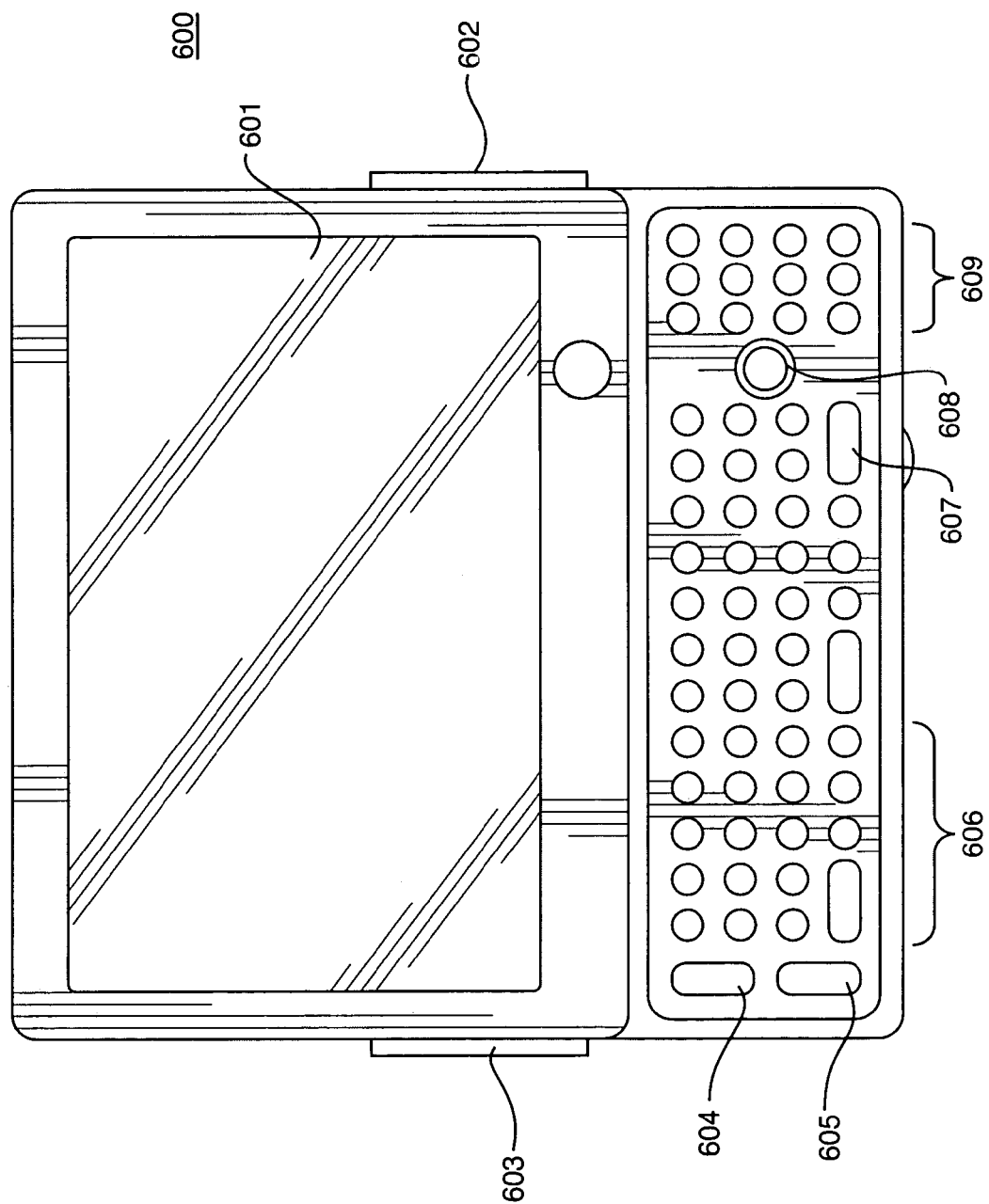

FIGS. 6A and 6B are embodiments of a hand-held device according to certain embodiments of the invention. For example, device 600 may be implemented as a part of system 500 of FIG. 5. In one embodiment, screen 601 of the computing device 600 may slide on a rack and pinion mechanism to reveal a thumb keyboard as shown in FIG. 6B. In one embodiment, a first wireless antenna 602 and a second wireless antenna 603 may be attached to opposite sides of device 600, where antennas 602-603 may be implemented as any one of the wireless antennas described above and shared by multiple wireless communication modules therein (not shown).

In addition, device 600 may further include a left mouse button 604, a right mouse button 605, sticky keys 606, an enter key 607, a track stick/ball 608, and a numeric keypad 609. Other components may also be included. Furthermore, in one embodiment, the computing device consists of a hand-held form factor. In one embodiment, the computing device 600 includes dimensions of approximately 4.9"×3.4"×0.9". In alternative embodiments, the computing device may consist of alternative dimensions.

Thus, multiple disparate wireless units sharing of antennas have been described herein. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

A machine-readable medium may include any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. An apparatus comprising:
   a first antenna;
   a second antenna;
   a first wireless communication unit of a first wireless communication standard, the first wireless communication unit comprising means for selecting one of the first and second antennas for use by the first wireless communication unit;
   a second wireless communication unit of a second wireless communication standard;
   means for sharing the first antenna and the second antenna between the first and second communication units; and
   switch control logic comprising:
      means for identifying a priority of an activity of the second wireless communication unit in connection with the first antenna;
      means for determining whether the identified priority is a predetermined priority; and
      means for opposing switching a connection of the second wireless communication unit from the first antenna to the second antenna if the identified priority is the predetermined priority.

2. The apparatus of claim 1, wherein the apparatus includes having a form factor of a hand-held computing device.

3. The apparatus of claim 1, wherein the means for selecting comprises means for selecting one of the first and second antennas based on quality of reception.

4. The apparatus of claim 3, wherein the second communication unit comprises means for selecting one of the first and second antennas not in use by the first communication unit.

5. The apparatus of claim 4, wherein the first communication standard is an Institute of Electrical and Electronics Engineers (IEEE) 802.11b standard, and the second communication is a (IEEE) 802.15 standard.

6. The apparatus of claim 2, wherein the first antenna is placed at a first of four sides of a chassis of the apparatus, and the second antenna is placed at a second side opposing the first side.

7. The apparatus of claim 2, wherein the apparatus is a computing device to execute at least one of a Windows® based and Linux® based operating system.

8. The apparatus of claim 7, wherein the apparatus includes an X86® based processor.

9. The apparatus of claim 1, wherein the means for determining whether the identified priority is a predetermined priority comprises means for determining whether the identified priority is a high priority.

10. The apparatus of claim 1, wherein the first wireless communication unit includes the switch control logic.

11. A method for use with an apparatus including a first antenna, a second antenna, a first wireless communication unit of a first wireless communication standard, a second wireless communication unit of a second wireless communication standard, and means for sharing the first and second antennas between the first and second communication units, the method comprising:
   (A) identifying a priority of an activity of the second wireless communication unit in connection with the first antenna;
   (B) determining whether the identified priority is a predetermined priority; and
   (C) opposing switching a connection of the second wireless communication unit from the first antenna to the second antenna if the identified priority is the predetermined priority.

* * * * *